June 15, 1937. H. A. WADMAN 2,084,285
APPARATUS FOR FORMING HOLLOW GLASS ARTICLES
Filed July 3, 1935 7 Sheets-Sheet 3

Witness:
A. A. Horn

Inventor:
Harold A. Wadman
by Brown + Parham
Attorneys.

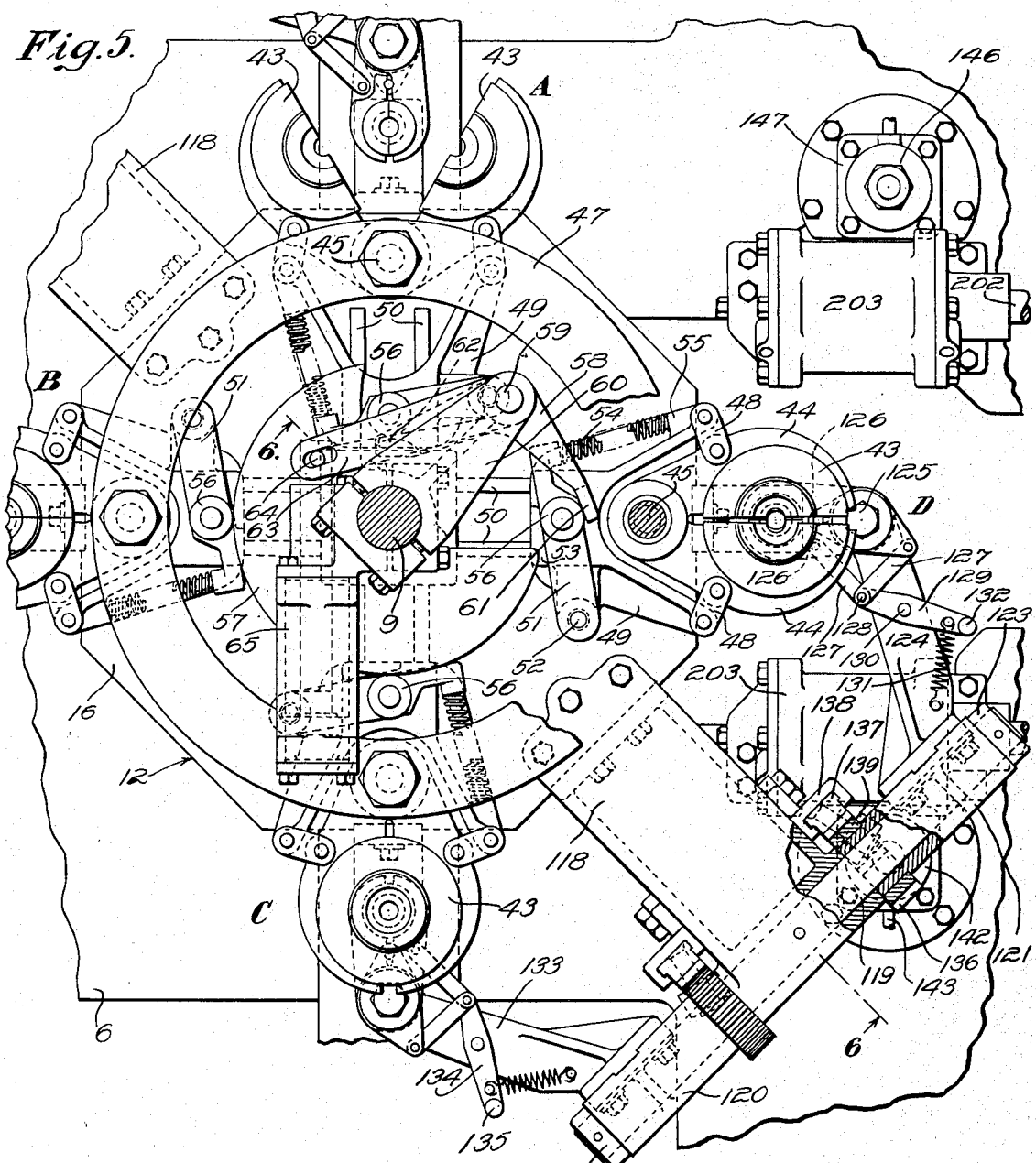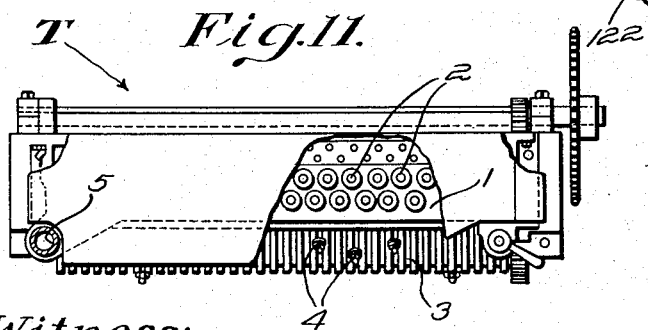

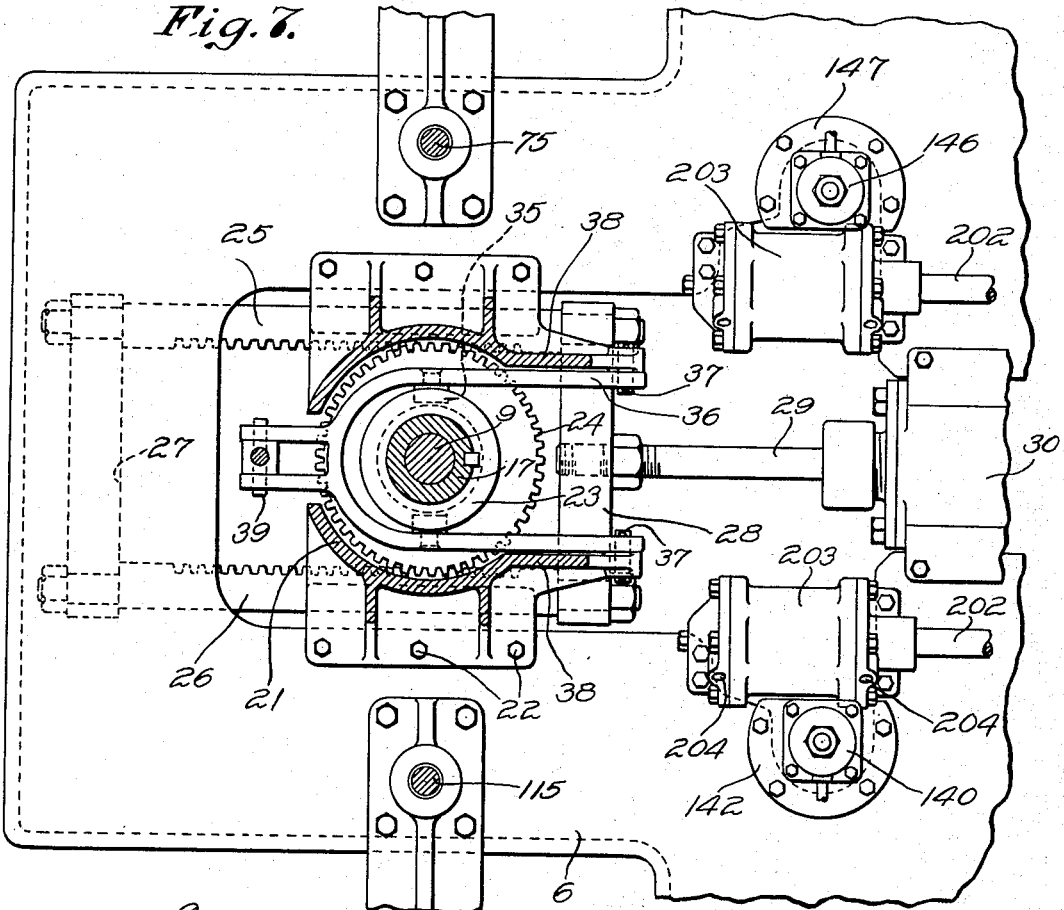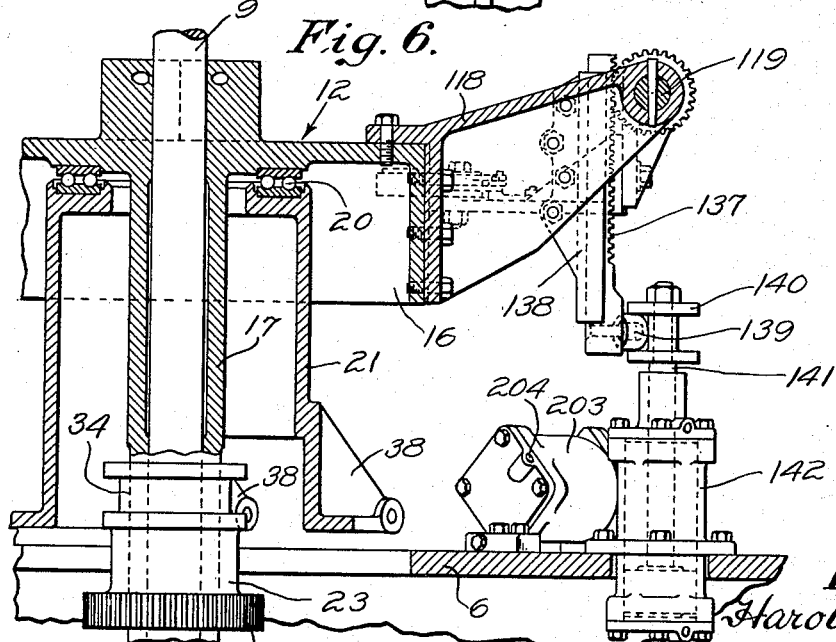

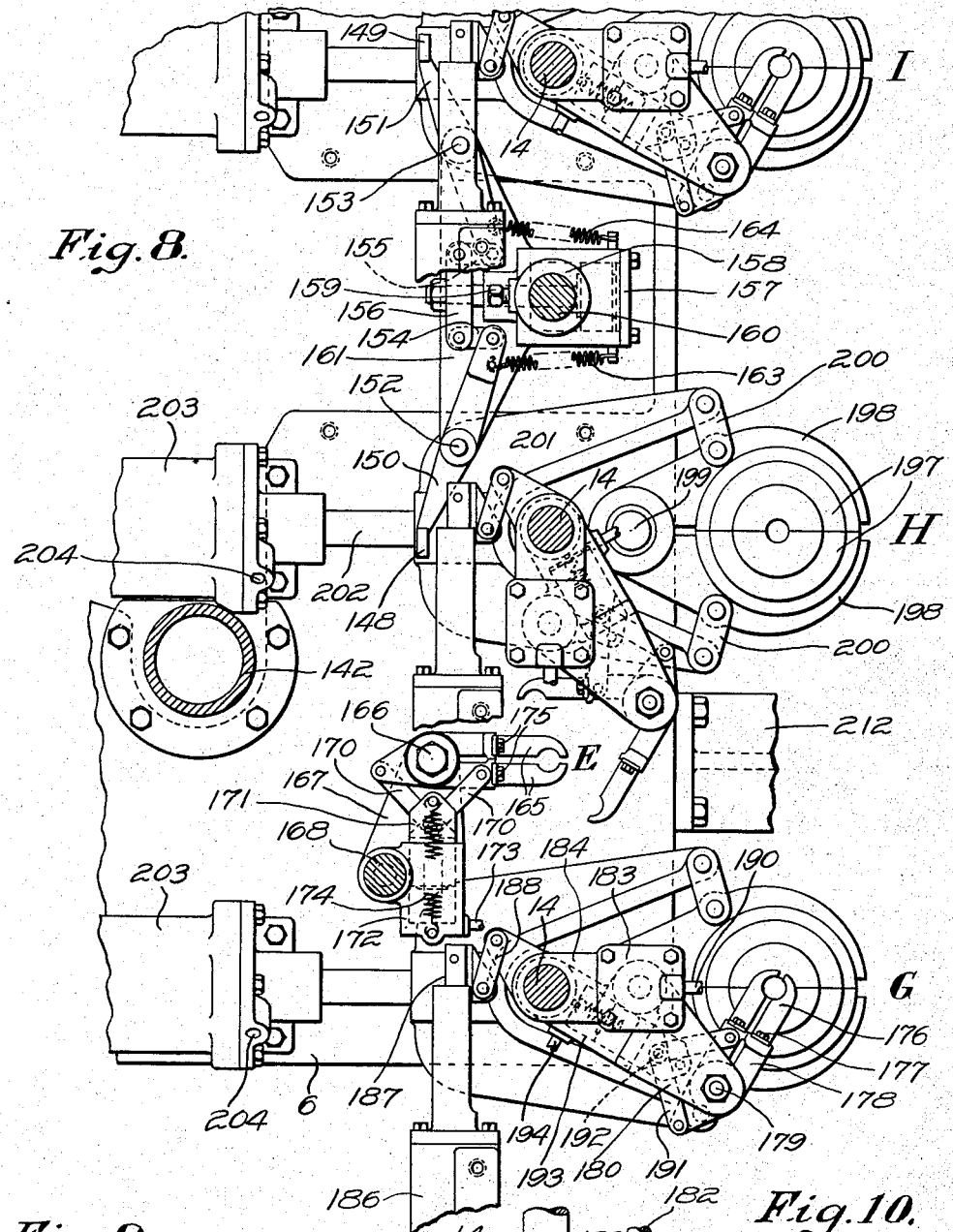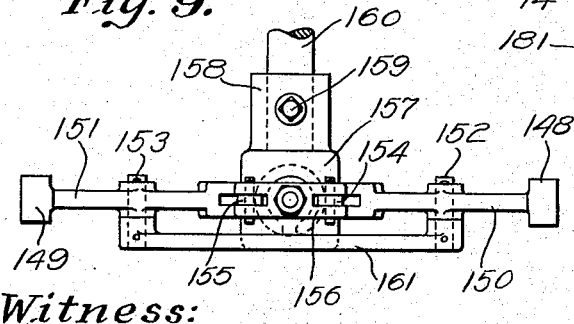

Patented June 15, 1937

2,084,285

UNITED STATES PATENT OFFICE 2,084,285

APPARATUS FOR FORMING HOLLOW GLASS ARTICLES

Harold A. Wadman, Bloomfield, Conn., assignor to Hartford-Empire Company, Hartford, Conn., a corporation of Delaware Application July 3, 1935, Serial No. 29,668

24 Claims. (Cl. 49—9)

My present invention relates to apparatus for forming hollow glass articles, and more particularly to apparatus for forming such articles efficiently and according to a desired cycle of operation by the use of a completely automatic machine.

In the prior art the "Hartford-Empire I. S. machine" represents a highly improved type of apparatus having a relatively desirable cycle of operation. This machine is practically effective to produce glass articles of the narrow neck type rapidly and efficiently. It has, however, certain features, which under certain circumstances and according to certain persons may be considered as disadvantageous. For example, it requires the use of a chute system in distributing charges of glass from a single source of such charges, such as an automatic glass feeder now common in the art, to the several stationary blank molds of the forming machine. It also has the feature which in certain instances may be considered a disadvantage, that the working level of the machine must be at least a predetermined distance below the level of the glass in the tank from which the machine is supplied with charges in order to permit of the interposition between the tank and the blank molds of the machine of the necessary charge distributing chute system.

In other prior art machines of the rotary type having either one or two tables, the rotating mold carrier or carriers have been of such large dimensions in order to provide for the use of the number of molds necessary to attain the relatively high production desired, that the devices have been cumbersome and have used excessive power. Also a difficulty has arisen in these devices that the radii at which the molds were carried were so great that the centrifugal force effective on the glass while unsupported laterally by one or another of the molds tended to swing the glass out and distort it, resulting in deformed articles.

Furthermore in rotary machines of the intermittently rotating type, the mass of mechanism which had to be intermittently rotated and stopped was in many instances so great that the starting and stopping inertia consumed large amounts of power and caused rapid wear of the parts.

My present invention seeks to attain the advantages of some or all of the prior types of machines and possibly certain further advantages peculiar to the present machine as will be hereinafter set forth, while eliminating in so far as possible the disadvantages inherent in the machines of the prior art. At the same time, my present machine is designed for a large production as related to the number of molds provided on the machine and for the efficient operation of such molds according to a desired cycle.

Among the specific objects of my invention is the provision of a machine having a plurality of rotary blank molds cooperating with a plurality of stationery blow molds, and more specifically one in which equal numbers of blank and blow molds are provided, these molds respectively cooperating with each other and with no other molds.

A further object of the present invention is to provide apparatus of the character set forth in which articles of the narrow neck type may be made and in which blank molds are positioned on a relatively light, intermittently rotating carrier at a minimum distance from the center thereof, so as to minimize the amount of centrifugal force on the blanks. Specifically, it is desired in this connection to provide an apparatus in which the blanks are always enclosed in the blank molds while the blank mold carrier is rotating, thus preventing distortion of the blanks due to centrifugal force.

A further important object of my invention is to provide peculiar and novel transfer means including one or more reheating stations for blanks intermediate the blank molds in which they are formed and the blow molds to which they eventually are transferred. Specifically it is an object that one such intermediate reheating station or position may serve a plurality of blank molds and also that blanks from that reheating station or position may be moved to a plurality of the blow molds. In this connection, it is also an object that the transfer means include specifically neck rings which are invertible according to the principles now in use in the "Hartford I. S. machine", thus effecting distortionless inverting and lateral movements of the blanks, combined with tongs by which the blanks are moved the remainder of the distance to their respective blow molds, and in one or more of which transfer means reheating will take place for desired periods of time.

A further object is to provide in a machine of the character generally above set forth for the formation of hollow glass articles in a cycle such that two or three, and under certain circumstances even four, charges of glass, all of which were supplied to the same blank mold, may be simultaneously in the process of formation, thus using the several molds to their best advantage and with a minimum of idle mold time and hence making bottles or other hollow glass articles according to the most advantageous cycle for each particular article being formed.

Further and more specific objects of the present invention will become apparent from a reading of the following description and appended claims when taken in connection with the accompanying drawings in which:

Fig. 4 is a view in vertical section taken on the line 4—4 of Fig. 1;

Fig. 5 is a fragmentary view principally in plan and with certain parts broken away and in horizontal section of the blank mold carrier and certain associated parts on a larger scale than that shown in Fig. 1;

Fig. 6 is a fragmentary view in vertical section taken substantially on the line 6—6 of Fig. 5;

Fig. 7 is a fragmentary view partly in plan and partly in horizontal section taken substantially on the line 7—7 of Fig. 4;

Fig. 8 is a fragmentary view principally in plan illustrating certain of the blow molds and the tongs transfer means associated therewith;

Fig. 9 is a detail view of the neck ring opening means in elevation as seen from the left at the center portion of Fig. 8;

Fig. 10 is a detail view principally in side elevation and on an enlarged scale of a portion of the tongs transfer means associated with each blow mold; and Fig. 11 is a detail view in plan with parts broken away of a timer which may be employed with my machine.

General arrangements of the machine

Figure 1:
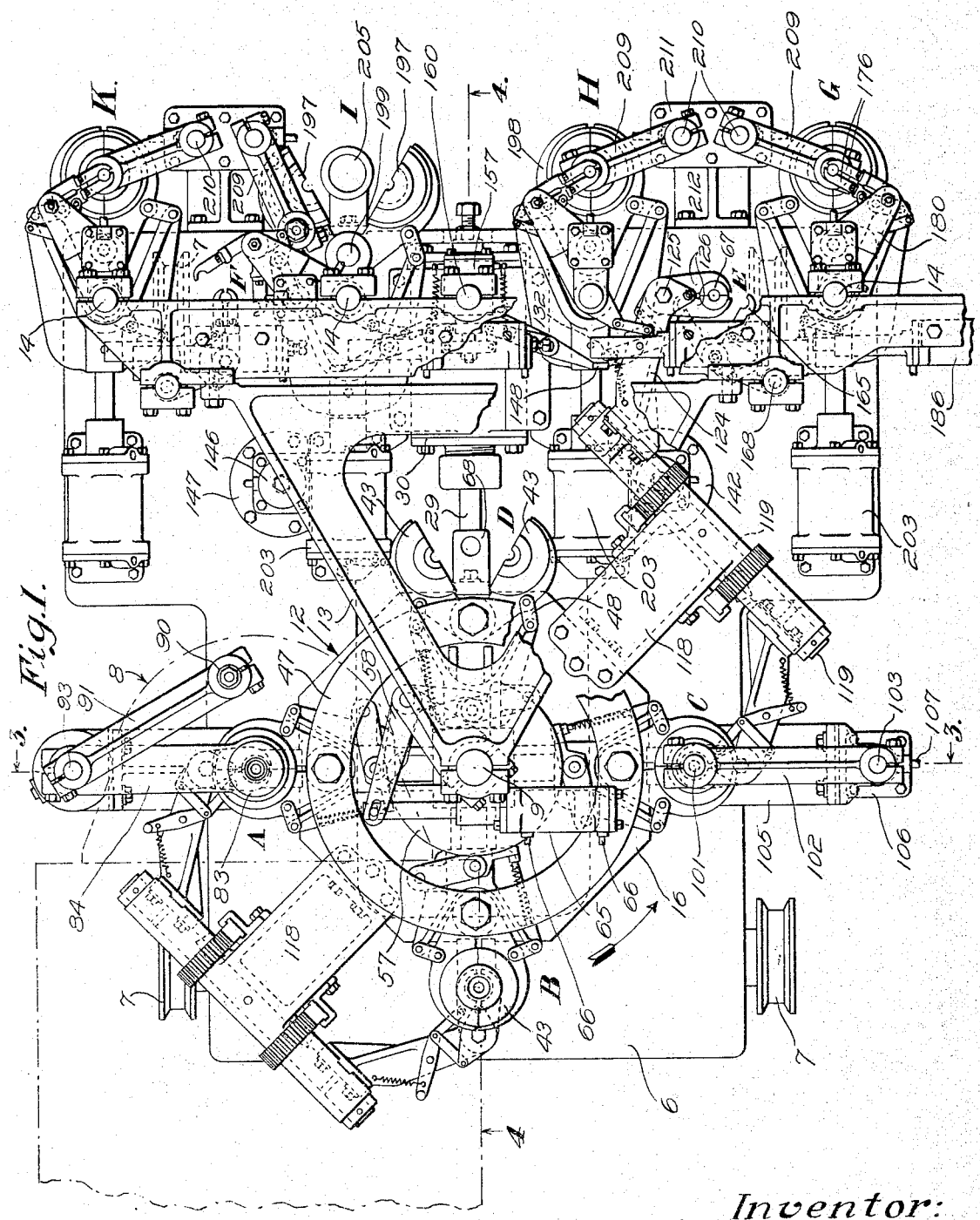
Figure 1 is a plan view with parts broken away of an entire machine embodying my invention, showing its relation to the glass feeder.

The machine which I have chosen as an embodiment of my invention comprises a base which may be mounted in any suitable position around the factory and on which is mounted an intermittently rotating blank mold carrier having suitable blank molds thereon, the operating means for rotating this carrier, certain of the blank forming instrumentalities, and also a plurality of stationary blow molds, which are arranged in a straight line, the mid portion of which is perpendicular to a line radial of the blank mold carrier through the transfer station thereof. Suitable transfer means are provided including the neck rings associated with the blank molds, intermediate stationary tongs to which the blanks are transferred by the neck rings, one tongs serving two neck rings and two blow molds, and secondary movable transfer tongs which move the blanks laterally from the stationary tongs to second reheating stations above and in axial alignment with the blow molds and thereafter move the blanks vertically downwardly to positions at which they may be enclosed by the blow molds. Suitable final blowing means are provided associated with each blow mold. It will be understood that any desired takeout means may be used to transfer articles from the blow molds to a delivery conveyor, the takeout means and the delivery conveyor not being illustrated.

The several operating instrumentalities of my machine are shown as operated by pneumatic pressure for air motors, although it will be understood that any other desired type of operating means could be used.

The timer

I have illustrated in Fig. 11 of the accompanying drawings, a timer generally indicated at T by which each of the various working instrumentalities hereinafter to be described are operated and their operation synchronized with the operations of other instrumentalities. This timer may be substantially the same type as is used in the commercial "Hartford I. S. machine" and disclosed in Ingle Patent No. 1,911,119, granted May 23, 1933, as well as in Ingle Patents Nos. 1,843,159 and 1,843,160, both granted Feb. 2, 1932. The timer T is driven from a suitable source of power in synchronism with the feeder by which glass charges are normally supplied to the machine of my invention. A single motor is preferably employed to operate both the feeder and the timer for the machine.

From the point of view of my present invention, the timer T may be described as comprising a valve box 1 including a plurality of valves diagrammatically illustrated at 2, each of which is independently operated and each of which communicates through a suitable pipe with a particular mechanism in the forming machine. A rotating drum 3 forming a part of the timer has on its periphery a plurality of grooves, one opposite each of the valves 2. In each of the circumferential grooves of the drum 3 a long and a short button, as shown at 4, may be secured in any desired adjusted position.

The arrangement is such that when a short button engages its respective valve operating mechanism associated with its respective valve, that valve will be opened to admit pressure from the common source of supply, here indicated by the pipe 5 to the associated mechanism of the forming machine. This pressure is continuously admitted until a long button located in the same groove engages the valve operating mechanism, at which time the valve is moved to a position to cut off further flow of pressure from the common supply to the associated operating mechanism and to exhaust pressure from that mechanism. Reference may be had if desired to the Ingle patents above referred to for a more complete disclosure of the valves and their operating mechanisms.

The timer T may be mounted in a manner not shown on or adjacent to the machine of my present invention, or may be located at any position near this machine, there being the necessary number of pipe connections from the timer to the several operating mechanisms on the machine hereinafter to be described. It will be understood that where necessary, flexible tubing is used to permit of the movement of the operating mechanisms of the machine. Inasmuch as this piping involves no invention on my part and, if shown, would complicate the drawings, it has been omitted therefrom except to indicate diagrammatically some of the end portions of the pipes leading from the operating mechanisms.

Stationary structure of machine-blank mold carrier and operating means

The machine proper of my invention as shown in the accompanying drawings comprises a main base member 6 which may be a casting or other suitable rigid part to which the timer T may be secured if desired. The base 6 is provided with wheels 7 which may be mounted on suitable rails (not shown) or on the floor of the plant in which the machine is used to facilitate movement of the machine to and from its operative position adjacent to a glass feeding device, here shown diagrammatically in dotted lines at 8 in Figs. 1 and 2. According to my invention, I prefer to so position the machine in respect to the feeder that charges separated from the main body of molten glass in the furnace or tank by the feeder may be dropped directly into the blank molds at the charging position thereof without the interposition of a chute or chute system.

Figure 2:
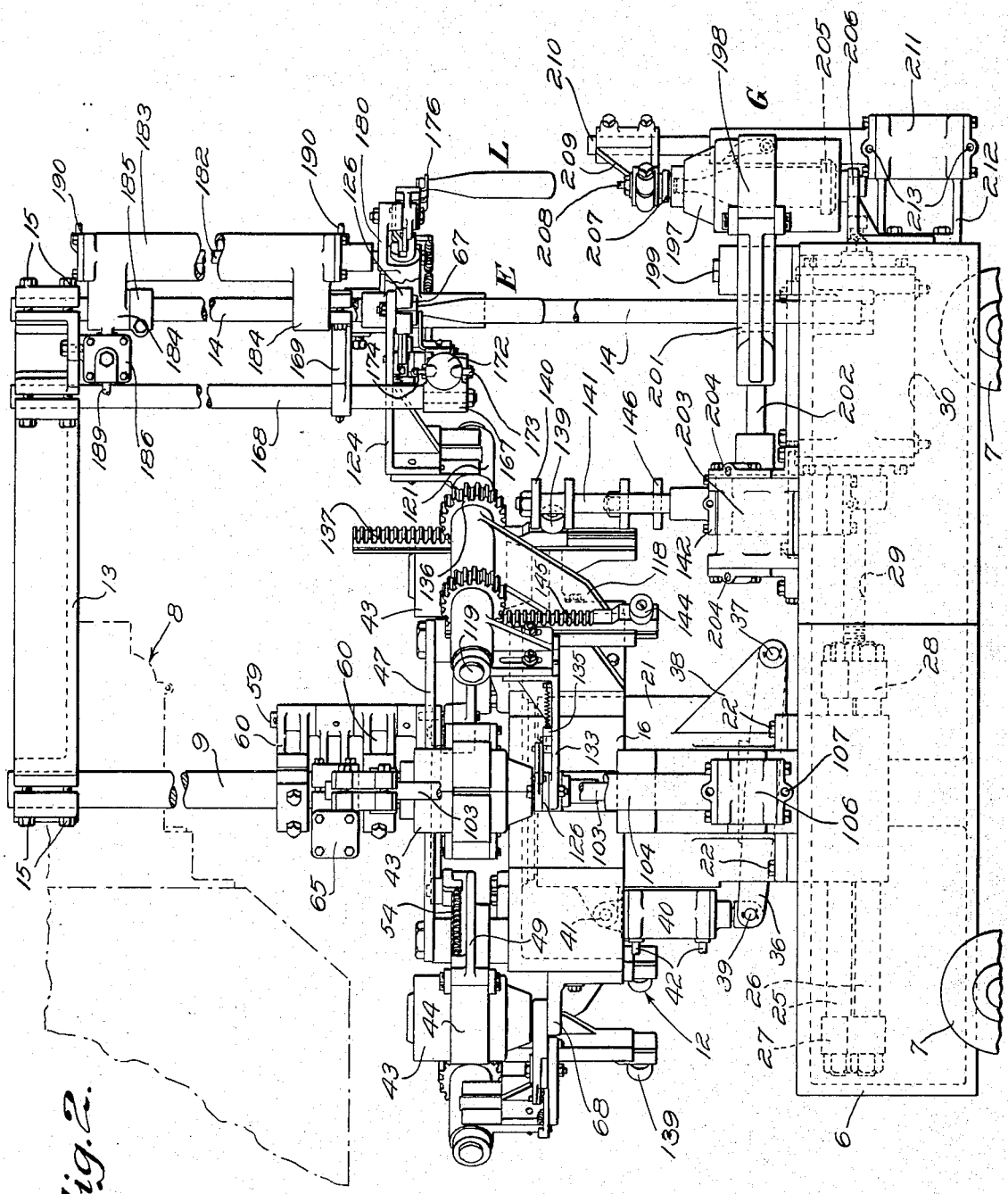
Fig. 2 is a view substantially in side elevation of the machine illustrated in Fig. 1, certain parts being foreshortened in order that the entire machine may be shown on one sheet on the scale selected.
Figure 3:
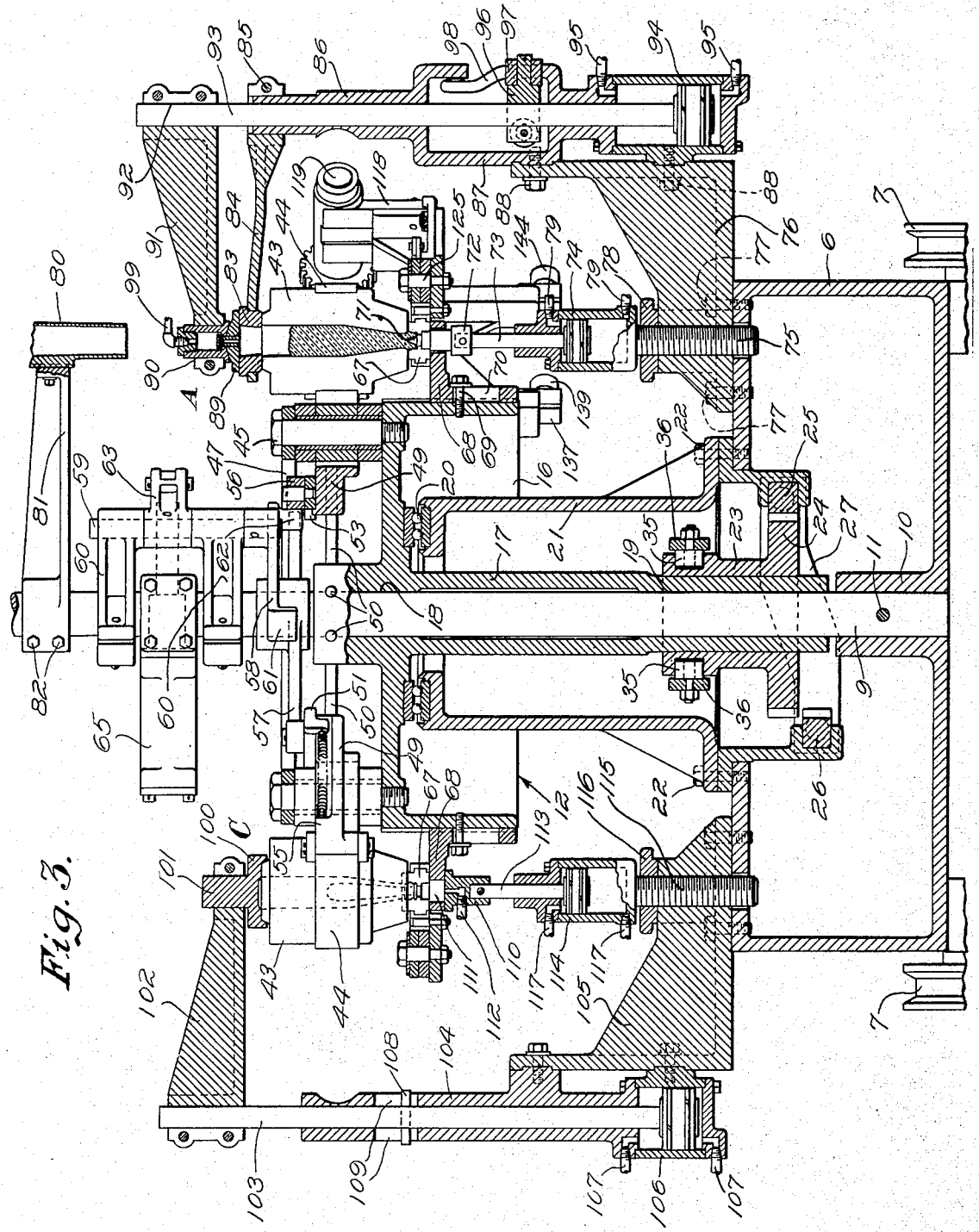
Fig. 3 is a view in vertical section taken on the line 3—3 of Fig. 1.
Figure 1:
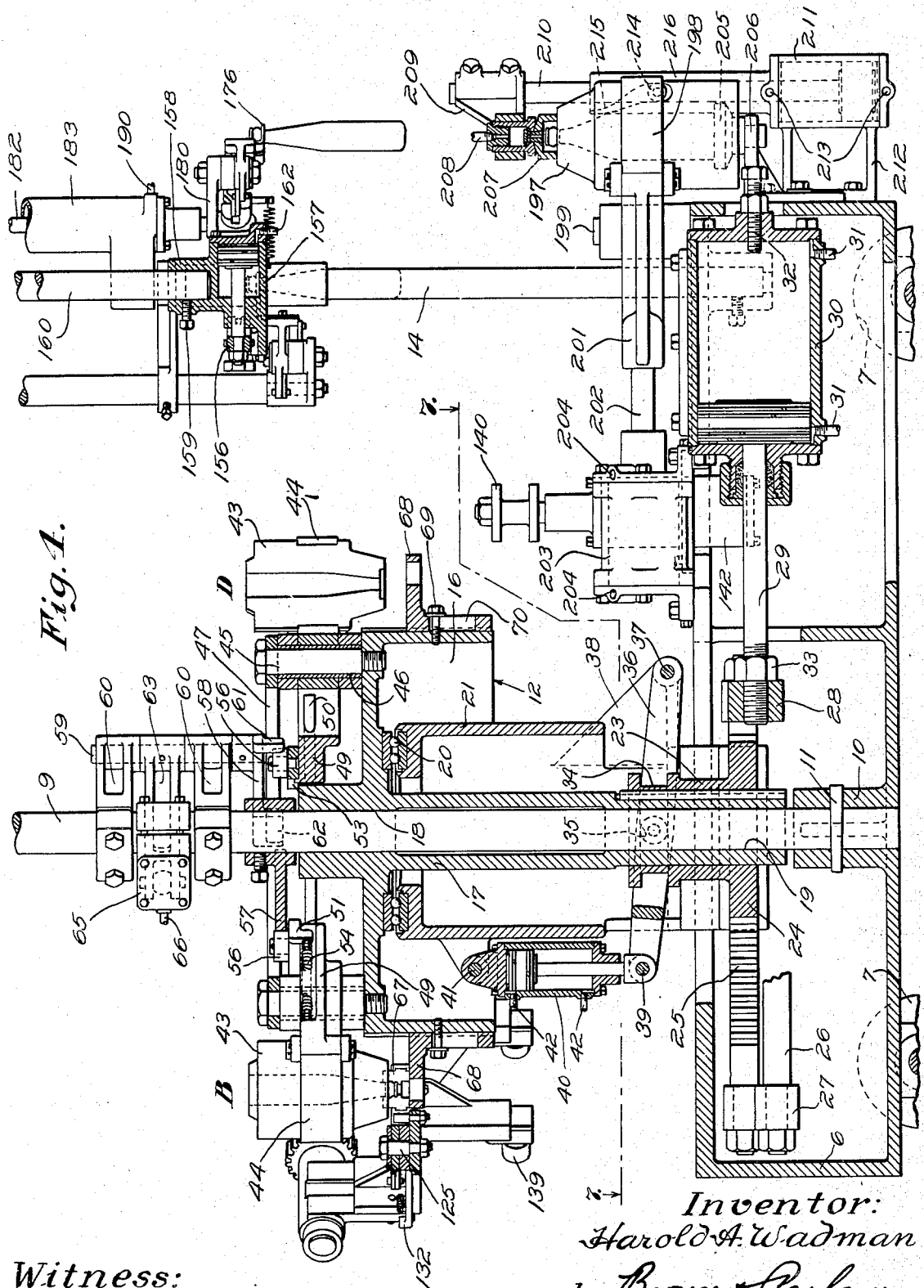

Suitably secured in the base 6 as shown best in Figs. 3 and 4, is a stationary column 9 which may be secured in a socket portion 10 of the base 6 as by a pin 11. About the column 9 the blank mold carrier generally indicated at 12 is mounted for rotation, as will be hereinafter described. At its upper end the column 9 has secured thereto one end of a substantially triangular stationary upper frame 13 which is also supported by a plurality of vertical columns 14. Each of the columns 9 and 14 is secured to the upper frame by a suitable cap and clamping bolt arrangement as indicated at 15, Fig. 2. The structure thus far described forms the principal stationary framework of the machine and to this structure substantially all the remaining parts are attached.

The blank mold carrier which is generally indicated at 12 comprises a main table member 16 which is substantially octagonal in its exterior contour and is provided with a depending skirt for attachment of the blank forming instrumentalities and certain of their operating means. The member 16 also has rigid and, in the modification shown, integral therewith a central sleeve portion 17 which bears on the center shaft 9 at 18 and 19. The weight of the rotating parts of the blank mold carrier is supported on ball bearings 20 interposed between the horizontal portion of the member 16 and a suitable annular support 21 which is secured to the base 6 as by bolts 22.

Means are provided for rotating the blank mold carrier intermittently. For this purpose, there is provided a member 23 which is splined on the hub portion 17 of the blank mold carrier, as best shown in Figs. 3, 4, 6 and 7, and which carries rigid or integral therewith a gear 24, the latter meshing alternately with two racks 25 and 26. The racks 25 and 26 are disposed at different levels, as best seen in Figs. 2, 3 and 4, and are connected at their ends by cross members 27 and 28. The member 28 is secured to the piston rod 29 of a pneumatic cylinder 30 which is in turn secured to the base 6 as shown in Figs. 1, 4 and 7. Pressure may be conducted to the opposite ends of the cylinder 30 through the pipes 31 from the timer T so as to move the racks 25 and 26 at the desired times. The length of stroke of the piston rod 29 and hence of the racks 25 and 26 may be controlled by a stop screw 32 threaded into the head end of the cylinder 30 and secured in adjusted position by the usual jam nut. The position of the racks at the ends of the stroke in either direction may also be controlled by the adjustment of the connection between the cross member 28 and the piston rod 29, the rod being threaded into this cross member and secured in adjusted position by the jam nut 33.

Means are provided for oscillating the gear 24 vertically to move it between its positions in engagement with the racks 25 and 26. For this purpose the upper portion of the member 23 is provided with an annular groove 34 into which extends a pair of rollers 35 carried by a yoke frame 36 which is pivoted at 37 to bracket extensions 38 of the member 21 and which extends through suitable apertures in the member 21 straddling the member 23, the yoke member 36 being connected at its other end at 39 to the lower end of the piston rod of a pneumatic cylinder 40 which is pivoted at 41 to a bracket extending from the member 21. Pressure may be conducted to the opposite ends of the cylinder 40 from the timer T through the pipes 42.

Thus the rotation of the blank mold carrier is effected as follows: starting with parts in the position shown in Figs. 2 and 4, with the piston in cylinder 30 at the left hand end of the cylinder, the first action in effecting the next rotation of the blank mold carrier, which is always in a counterclockwise direction, is the lowering of the member 23, which is accomplished by the admission of pressure to the upper pipe 42 of cylinder 40 from the timer. This lowers the piston in the cylinder 40 and moves the yoke member 36 in a counterclockwise direction, lowering the member 23 to move the gear 24 into engagement with the rack 26. Pressure is then conducted from the timer to the pipe 31 leading to the left hand end of cylinder 30, as seen in Fig. 4, causing a movement of the piston in this cylinder to the right and causing the movement of the rack 26 to the right, thus rotating the blank mold carrier counterclockwise for an angular distance corresponding to the distance between blank molds, which in the present case is 90°.

When it is desired to move the blank mold carrier another step in its movement, the member 23 is raised by the reversal of pressure to the cylinder 40 under control of the timer T to move the gear 24 into engagement with the rack 25, after which pressure is reversed to the cylinder 30 and the piston therein moved from right to left, bringing the parts again to the position shown in Figs. 1 and 4.

*Blank molds, mounting and operating means therefor*

As shown in Figs. 1 to 5, there is a plurality, in this instance four, blank molds 43 mounted on the blank mold carrier which is generally indicated at 12, these molds being in neck down position. Each blank mold is preferably formed in the usual manner in complementary portions or halves secured interchangeably in mold carriers 44. As best shown in Fig. 5, the mold carriers are pivoted on a common pintle 45 which may be formed as a stub shaft rigidly secured in the table member 16 as shown in Fig. 4. For convenience of construction, the mold carriers 44 may have their bearing portions received upon a common sleeve 46 which is in turn journaled on the pintle 45 so that the mold holders may be removed as a unit, if it is desired to change them for some purpose. The upper portions of the pintles 45 extend through an annular ring 47 connecting them together and thus insuring the rigidity of the construction.

For opening and closing each of the blank molds, the mold holders 44 are connected by links 48 with the outer ends of a yoke 49 which is mounted for radial movement with respect to the blank mold carrier on a pair of parallel rods 50 secured in a hub portion of the mold carrier. The yoke 49 straddles the bearing portions of the mold holders 44. Each of the yokes 49 is provided with a lever 51 pivoted thereto at one side, as at 52, and normally bearing against a fixed stop portion 53 which is rigid or integral with the yoke 49. The lever 51 is continuously urged in a counterclockwise direction as seen in Fig. 5 toward its engagement with the stop 53 by a compression spring 54 extending between the outer end of the lever 51 and a suitable stop formed as a shoulder 55 on the yoke, there being short studs concentric with the ends of the spring 54 for preventing the displacement thereof. The lever 51 carries on an upstanding pintle a cam roller 56 for engagement by mold opening and closing mechanism hereinafter to be described.

The blank molds are moved by the table rotating means hereinabove described between the stations A, B, C and D, station A in the form shown herein being the charging and settle blowing station, station C the counterblowing station, and station D the transfer station. According to the cycle of the machine as shown, it is desired that the blank molds be opened at station D, that they remain open from station D to station A, and that they be closed at station A. The remainder of their travel, that is from station A around to station D, the blank molds are retained closed. For retaining the blank molds closed between stations A and D, there is provided a fixed stationary cam 57 engaging the inside of the cam rollers 56 and thus resiliently holding the molds closed under the action of the springs 54, the cam 57 being secured to the stationary column 9 as shown in Fig. 4.

I have shown in the accompanying drawings, Figs. 1 to 5, a common means for opening a blank mold at station D and simultaneously closing another blank mold at station A. For this purpose there is provided a bell crank lever 58 which is secured intermediate its ends to a vertical pintle 59 journaled in stationary brackets 60 which are secured to the stationary center column 9, as shown in Figs. 3, 4 and 5. The bell crank 58 has a roll contacting portion 61 on one end arranged to engage the cam rollers 56 associated with a blank mold at station D and also has a portion 62 for engaging the radially inner side of the cam roller 56 of a blank mold located at station A. Thus, starting with the bell crank 58 in the position shown in Fig. 5, movement of the bell crank in a clockwise direction from this position will move the cam roller 56 of a blank mold at station D radially inwardly to open this mold, due to the portion 61 engaging the cam roller 56 of this mold and moving it inwardly, and at the same time the portion 62 of the bell crank will engage the roller 56 of a blank mold at station A to move this cam roller radially outwardly of the blank mold carrier and close the mold at station A.

For rocking the bell crank 58, the pintle 59 to which it is attached is provided intermediate its bearings in brackets 60 with a lever 63 secured thereto and having a pin and slot connection 64 at its outer end with the piston rod of a pneumatic cylinder 65 best shown in Fig. 5. Pressure may be conducted to the opposite ends of the cylinder 65 from the timer T through pipes 66, Figs. 1 and 4. Thus, the opening and closing of the molds is controlled by the timer through the mechanism hereinabove described.

Associated with each of the blank molds is a neck ring generally indicated at 67, the details of the mounting and operation of which will be hereinafter described in a separate section. For the present it will be sufficient to state that this neck ring is in its operative position in relation to the blank mold as shown in Fig. 3, while at the charging station A and continuously up to the time that the blank mold opens at station D, the neck ring resting at this time on a vertically adjustable bracket 68 which is secured in adjusted position in respect to the depending skirt portion of the member 16 by a bolt 69 passing through a vertical slot 70 in the bracket 68 and threaded into the skirt portion of the blank mold carrier. The vertical adjustment of the bracket 68 serves the purpose of accommodating this part to the use of blank molds of different lengths.

The neck pin, operating means and adjusting means therefore

While under certain circumstances it may be desired that the neck pin here shown at 71, Fig. 3, be mounted for movement with the blank mold on the blank mold carrier, I have illustrated a construction in which this neck pin is arranged solely at station A and its mounting and operating means are supported from the base 6 independent of the blank mold carrier, thus lightening this carrier and permitting the rotation thereof with a minimum of power.

The neck pin 71 is interchangeably mounted at 72 on the upper end of a piston rod 73 extending vertically from a pneumatic cylinder 74. The interchangeable mounting permits of the substitution of neck pins of different types and/or sizes for making different types and sizes of bottles. The cylinder 74 is provided with a downwardly extending threaded stem 75 which is screwed into a bracket 76 secured to the base 6 of the machine as by bolts 77. For adjusting the neck pin vertically for compensating for molds of different heights, the cylinder 74 is screwed up or down to the necessary extent with respect to the bracket 76 and may be locked in adjusted position by a jam nut 78 also threaded on the stem 75.

For moving the neck pin 71 to and from its operative position, pressure is supplied to the opposite ends of the cylinder 74 from the timer T through the pipes 79.

Charge guiding means

I have shown in conjunction with my machine, particularly in Fig. 3, two charge guiding members the upper of which is illustrated at 80, and is secured in a stationary but adjustable position on the outer end of an arm 81 which is vertically and angularly adjustably secured to the center column 9 of the blank mold carrier as by the bolts 82.

I have also provided immediately above the blank mold but unattached thereto a funnel member 83 through which charges are guided into the blank mold. The member 83 is preferably loosely mounted in the outer end of an arm 84 which is vertically adjustably secured as at 85 to the upper end of a sleeve portion 86 of a bracket 87, which is secured as by the bolts 88 to the bracket 76 above referred to. The loose mounting of the funnel member 83 permits this member to accommodate itself to the contour of the upper surface of each of the blank molds 43 which are moved therebeneath in succession. The arrangement is preferably such that the funnel member 83 will be lifted slightly with respect to the arm 84 by each blank mold as it moves therebeneath and will be pressed down against the blank mold by the settle head hereinafter to be described, so as to secure a substantially airtight contact.

The settle blowhead, mounting and operation

Referring to Figs. 1 and 3, I have shown at 89 a settle blow head, which may be of any conventional construction and which is preferably loosely mounted with respect to a head member 90, so as to seat evenly and in a substantially airtight relation on the top of the funnel 83 as shown in Fig. 3. The details of the head, per se, form no part of the present invention and may be assumed to be conventional. The settle blowhead is secured to the outer end of a laterally extending arm 91, which is vertically adjustably secured at 92 to an upstanding rod 93, which forms the piston rod of a pneumatic cylinder 94. The cylinder 94 is suitably secured to the bracket 76.

Thus the head members 89 and 90 may be moved vertically by the movement of the piston within cylinder 94, which is accomplished by admitting pressure to the upper and lower ends of the cylinder at the desired times through the pipes 95 from the timer T. It is also desired that the settle head be moved laterally subsequent to this initial vertical movement away from the mold and in response to its continued upward movement. For this purpose, the shaft 93 is provided with a laterally extending bracket 96 carrying a cam roller 97 working in a stationary cam slot 98 formed in a part of the bracket member 87 substantially concentric with the shaft 93. This construction is conventional and is substantially equivalent to that employed in the commercial "Hartford I. S. machine" shown and described in the Ingle Patent No. 1,911,119, above referred to. Settle blowing pressure may be conducted to the head 89—90 through a pipe 99 from the timer T and thence through the passages shown in Fig. 3 in the conventional manner to the underside of the head 89, thence through the funnel into the upper end of the mold 43.

While I have shown and described a conventional type of settle blowing mechanism, it will be understood that, if desired, some other means of settling charges in the blank mold may be employed, for example the settle plunger mechanism shown and described in the Rowe Patent No. 1,945,983, granted Feb. 6, 1934. This or any other type of blank formation may be employed within the purview of the appended claims.

Also, while in the machine of the accompanying drawings I have shown settle blowing as occurring at station A, it will be understood that if desired the blank molds may be charged and the charges settled therein by any desired or conventional means at station B, the only changes necessary for accomplishing this purpose being to provide for the feeding of the molds at this station and to move various mechanisms for forming blanks and hereinbefore described, including the funnels, neck pin and its operating mechanisms, and the settle blow head and its operating mechanism from station A to B. Certain other variations hereinafter to be set forth may be resorted to within the scope of the appended claims.

The counterblowing means, construction and operation

I have shown the counterblowing means at station C in the accompanying drawings, although it will be understood that counterblowing means may be provided at either or both stations B and C, if the charging takes place as particularly illustrated at station A. In any event, the same or some equivalent counterblowing means may be used whether these means be located at stations B or C, or whether they be duplicated at both stations.

The counterblowing means includes a baffle generally indicated at 100 adapted to engage over the upper or bottom end of the blank mold, as shown at the left in Fig. 3. This baffle 100 is provided with a stem 101 which is secured in a split collar on the end of an arm 102 extending laterally from and vertically adjustably secured to a vertical shaft 103. The shaft 103 is mounted for longitudinal vertical movement in an elongated bearing 104 of a bracket which is secured to a bracket 105, the latter in turn being secured to the base 6 of the machine. The vertical adjustment between the arm 102 and the shaft 103 provides for the accommodation of molds of different heights. The removable connection between the arm 102 and the counterblow baffle 100 provides for the interchange of baffles for making ware of different types.

Means are provided for moving the counterblow baffle vertically, such means including a pneumatic cylinder 106 which is formed as a part of or rigid with the bracket member including the bearing 104 and rigid with the bracket 105 to which the cylinder is secured as shown. The shaft 103 forms the piston rod of the cylinder 106 and is moved vertically by the admission of pressure to the opposite ends of this cylinder from the timer T through the pipes 107.

Means are provided for preventing lateral movement of the bottom plate 100 about the axis of the shaft 103, such means including a transverse pin 108 secured in the shaft and extending into the vertical elongated slots 109 formed in the bearing member 104. Lateral movement of the baffle is unnecessary as the molds are merely rotated to a position therebeneath and no access need be had into the mold from above at this station.

A counterblow head 110 is provided as shown which is adapted to engage against the lower surface of the bracket 68 which has an aperture 111 therethrough aligned with the aperture through the neck ring 67 and thus communicating with the interior of the blank mold, specifically with the depression formed in the glass by the neck pin. Pressure may be supplied to the head 110 through the pipe 112 from the timer T for counterblowing the charge at the desired time and for any predetermined adjustable period, as determined by the setting of the timer.

The head 110 is carried on the upper end of a piston rod 113 extending vertically from a pneumatic cylinder 114, which is provided at its lower end with a threaded stem 115. The stem 115 is screwed into a threaded bore in the bracket 105 as shown. When it is desired to adjust the head 110 vertically to compensate for molds of different heights, the cylinder 114 and stem 115 are threaded up or down as need be in respect to the bracket 105 and the adjustment secured by a jam nut 116 which is also threaded on the stem 115. Pressure may be supplied to the opposite ends of the cylinder 114 through the pipes 117 from the timer T for moving the counterblow head 110 vertically to and from its operative position at the desired times.

The neck rings, mounting and operation

In the apparatus of my invention, the neck rings are utilized first in the formation of blanks as above set forth and later in transferring the blanks from the blank molds part way to the blow molds. They are also utilized in inverting the blanks from a neck-down to a neck-up position. There is one neck ring for each of the blank molds and each of the neck rings is independently invertible and is provided with its individual opening and closing means movable therewith. This means normally tends to retain the neck rings resiliently closed, there being a single means not partaking of the movement of rotation of the blank mold carrier for opening the neck rings.

As shown, the blank mold carrier is provided with oppositely arranged brackets 118 by which the neck rings are carried. Each of the brackets 118 supports a transversely extending substantially horizontal pivot shaft 119, this shaft forming the pivot about which two neck rings are mounted cooperating with adjacent molds. As shown (Fig. 5) the neck rings associated with the molds at stations C and D are both mounted on a single pivoted shaft 119. Surrounding each extending end of this shaft are rotatable collars 120 and 121 which are retained on the shaft by suitable relatively stationary collars 122 and 123 which are pinned to the shaft 119. The collar 121 has vertically adjustably secured thereto an arm 124 which in turn carries the pintle 125 on which the holders 126 for one of the neck rings are mounted, as best shown in Figs. 1, 3 and 5. The neck ring is shown in its inverted position in Fig. 1 in a manner to show the holders thereof and their pivotal arrangement on the arm 124. The neck ring 67 is formed as in the usual manner in mating halves, the halves being supported in the holders 126 by suitable means (not shown). The vertical adjustment between the arm 124 and the collar 121 compensates for blank molds of different heights, there being suitable means such as a screw (not shown) for holding these parts in adjusted position.

Means are provided moving with each neck ring for holding it closed under resilient pressure for the major part of the cycle and for cooperation with the single opening means later to be described at the desired time. As shown (Fig. 5), the neck ring holders 126 are connected by links 127 with a common pintle 128 which is mounted on the end of a lever 129 pivoted at 130 to the arm 124. A tension spring 131 extends between a fixed anchorage on the arm and a point on the lever 129 and tends at all times to retain the neck ring closed. The end of the lever 129 opposite the pintle 128 is provided with an upstanding portion 132 for engagement by the opening means hereinafter to be described.

It will be understood that the neck ring shown in Fig. 5 cooperating with the mold at station C is arranged in exactly the same way as that at station D and is supported by the arm 133 corresponding to the arm 124, there being equivalent mechanism and adjustments for this neck ring and the operating lever 134 associated therewith corresponding to the lever 129 and having an upstanding portion 135 for engagement by the opening means later to be described.

Means are provided for inverting the neck rings from the position which they occupy during the formation of a blank, that is, with the neck ring positioned as shown in Fig. 3 resting on the bracket 68 to the position shown at the lower right-hand portion of Fig. 1. For this purpose each neck ring holding sleeve, such as 120 and 121, is provided with a gear as 136 secured to the sleeve. The gear 136 which is secured to the sleeve 121 as shown (Fig. 5) meshes with a vertically movable rack 137 mounted in a vertical guide 138 secured to the bracket 118 and having at its lower portion a roller 139. The rollers 139 are arranged to be moved by the rotation of the blank mold carrier into an annular groove formed by a spool-like member 140 secured to the upper end of a piston rod 141 of a vertically disposed pneumatic cylinder 142. Pressure is conducted to the opposite ends of the cylinder 142 from the timer T through the pipes 143.

The leading neck rings associated with each of the brackets 118, that is the neck rings associated with the molds at stations B and D at the position of the parts shown in Figs. 1 and 5, are operated for inversion by the cylinder 142 and move the blanks from the position D to the position E shown in Figs. 1, 2 and 8. The following neck rings, that is the neck rings associated with the molds shown positioned at stations A and C in Figs. 1 and 5, are arranged to transfer blanks from their respective molds when those molds are at station D to another reheating station shown at F in Fig. 1. The operation of these neck rings and their inversion is exactly the same as that just described, but they are operated by a different cylinder cooperating with the rollers 144 on the lower ends of their operating racks 145. These rollers 144 are moved by the rotation of the blank mold carrier between the ends of a spool-like member 146 mounted on the piston rod of a pneumatic cylinder 147, Figs. 1 and 5, the operation of this cylinder being controlled by the timer in exactly the same way as is the operation of cylinder 142.

Blanks are transferred from the blank molds at station D and to stations E or F in alternation and according to whether the leading or the following neck ring is associated with the mold at station D in the transfer position. Thus the reheating stations E and F are each common to two blank molds, that in station E cooperating with the blank molds shown in Figs. 1 and 5 at B and D and that at station F cooperating with the blank molds shown in these figures at stations A and C. These intermediate reheating stations also are common each to two of the final blow molds which in the machine shown respectively cooperate with the several blank molds. At each of stations E and F, there is a stationary tongs hereinafter to be described in which the blanks are held for reheating, although as will appear hereinafter it may under certain circumstances be unnecessary to provide these tongs should it be desired to make up a machine without having as long a reheat period as is provided by the machine herein particularly described.

Means are provided according to my invention for opening the neck rings after they have inverted and transferred the blanks to stations E or F, as the case may be. For this purpose, there is provided means for engaging the upstanding portions 132 and 135 of a neck ring which is at either of the positions E or F. The portions 132 and 135 at either of these stations will be engaged by the outer ends 148 or 149, Figs. 8 and 9 of levers 150 or 151 respectively. These levers are pivoted intermediate their ends at 152 and 153 respectively. The inner ends of these levers are connected by links 154 and 155 respectively to a cross head 156 which is secured to the outer end of the piston rod extending from a pneumatic cylinder 157. The cylinder 157 is provided with an upstanding socket portion 158 which is connected by a suitable set screw 159 to the lower end of a depending shaft 160 secured to the upper frame 13 as illustrated in Fig. 1. The pintles 152 and 153 about which the levers 150 and 151 are respectively pivoted are secured to a bracket portion 161 which is carried by and rigid with the cylinder 157 as shown in Figs. 8 and 9.

For moving the members 148 and 149 to open the neck rings at desired times, pressure may be conducted from the timer through pipe 162 (Fig. 4) to the right hand end of cylinder 157. This causes the piston to move to the left in this cylinder as seen in Figs. 4 and 8 and causes the outer end portions 148 and 149 of levers 150 and 151 to move to the right as seen in Fig. 8. At this time one of these outer end portions will be in engagement with the upstanding portion 132 or 135 respectively of a neck ring which has been inverted from the position it occupied during the formation of the blank therein and the stationary tongs hereinafter to be described will have closed about the blank beneath the neck ring. The neck ring in question will then be opened as above set forth to release the blank after which the neck ring inverting means will again operate to return the neck ring back to its position for the formation of the next succeeding blank. Once the inversion has progressed sufficiently so that the contact portion 132 or 135 clears the end portion 148 or 149 respectively, the neck ring will again be closed under the action of its spring 131. At any desired time subsequent to this returning of the neck ring, the neck ring opening levers 150 and 151 may be returned to their initial position under the tension of springs 163 or 164, which are connected respectively between levers 150 and 151 and stationary anchorages on the cylinder 157.

*Stationary tongs at the first reheating station*

At each of the reheating stations E and F, there is preferably a stationary tongs for receiving the blanks from the neck rings and holding them for a desired period at the stationary positions for reheating. Inasmuch as these tongs are each similar to the other, only one will be described.

Referring to Fig. 8, I have shown at 165 the stationary tongs at station E, these tongs being suitably secured to tong holders journaled about a common pintle 166, which is carried by a bracket 167 secured to the lower end of a depending shaft 168, which is secured as best shown in Fig. 2 to the upper stationary frame 13. The shaft 168 is also steadied in its position by a cross bracket 169 (Fig. 2) extending to one of the vertical shafts 14.

For operating the tongs 165, they are connected by links 170 with a common pintle carried by a piston 171 in a pneumatic cylinder 172. Pressure may be supplied to one end of this cylinder, as shown, through a pipe 173 from the timer T for moving the piston in a direction to close the tongs. Opening of the tongs may be effected as shown by means of one or more tension springs 174 connected between the piston 171 and a fixed anchorage on the cylinder 172. Thus, opening of the tongs will be effected by the spring 174 upon exhaustion of the pressure by the timer through pipe 173.

Vertical adjustment of the tongs 165 may be effected to compensate for different heights of blank molds and consequently different vertical adjustment of neck ring arms as 124 in respect to the sleeve 121 (see Fig. 2) by a vertical adjustment between the tongs members 165 and their holders, this adjustment being secured once it has been made by bolts 175 connecting the tongs members to their respective holders.

*The moving tongs, construction, mounting and operation*

Associated with each of the final blow molds hereinafter to be described is a movable tongs which is arranged to grasp a blank at the position at which it is released from the neck ring which is associated with the blank mold which forms blanks for the particular blow mold in question. As shown, the moving tongs grasp the blanks at stations E or F, there being four blow molds at stations G, H, I and K respectively, blow molds at stations G and H being supplied with blanks from the reheating station E and blow molds at stations I and K being supplied with blanks from the reheating station F. Thus, while I have chosen to show stationary tongs at stations E and F, it will be understood that blanks could be grasped directly from the neck rings at these stations and transferred by the tongs presently to be described in this section to the respective blow molds.

As shown, however, the tongs associated with each blow mold are arranged to engage blanks immediately below the tongs 165 at stations E and F and move them first laterally by a swinging movement to a position vertically above and in alignment with their respective blow mold, which is the secondary reheating position or station and thereafter to move the blanks downward into the respective blow mold. Inasmuch as all these moving tongs are essentially similar, only one, the one associated with the blow mold at station G, will be particularly described, it being understood that the only difference between this tongs and the others is the direction of the angular swinging movement and the particular arrangement of the parts necessary therefor, the parts, however, all corresponding part for part between the tongs and their several operating mechanisms.

Considering the tongs cooperating with the blow mold at position G, and particularly considering Figs. 1, 2, 4, 8 and 10, the tongs are shown at 176, these tongs being vertically adjustably mounted as by bolts 177 (Fig. 8) on tongs holders 178 which are pivoted on a common pintle 179 to a bracket 180 secured to or integral with a sleeve 181 (Fig. 10) vertically slidable on the adjacent vertical column or shaft 14. The vertical position and movement of the tongs, their sleeve 181 and bracket 180, in respect to the shaft 14, is controlled by connecting the bracket 180 to a vertically extending rod 182 which forms the piston rod of a vertically arranged pneumatic cylinder 183. The cylinder 183 has a pair of bracket portions 184 rigid or integral therewith forming bearings about an upper part of the shaft or column 14, as best shown in Figs. 2 and 8, these portions being prevented from downward movement on the column by a collar and set screw 185 and the bracket 169, both of which are secured to the shaft 14.

For moving the tongs laterally about the vertical axis of the shaft 14, there is provided means controlled by the timer including the pneumatic cylinder 186 (Figs. 2 and 8) which is secured to the upper stationary frame 13. The piston rod 187 of this cylinder is connected by a pivoted link 188 to a crank extension of the upper bracket or extension 184 of cylinder 183 as shown in Fig.

8, so that downward movement of the piston in cylinder 186 as seen in Fig. 8 will result in the counterclockwise movement of the tongs 176 to a position to grasp a blank at station E, while upward movement of this piston will cause the tongs to move clockwise to a position in alignment with the blow mold at station G. It will be understood that pressure is supplied to the opposite ends of cylinder 186 from the timer T through pipes as shown at 189 (Fig. 2) for accomplishing the desired movements of the piston therein.

Vertical movement of the tongs in lowering blanks from the position of the blank at L, or the second reheating position (Fig. 2) to the blow mold at station G, is accomplished by movement of the piston within the cylinder 183, which is operated under control of the timer supplying pressure to the opposite ends of this cylinder through pipes 190.

Opening and closing movement of the tongs 176 is provided for by connecting each of the tongs holders 178 through links 191 (Fig. 8) with a common pintle 192 carried by the piston of a pneumatic cylinder 193 (Figs. 8 and 10), which is formed as a part of the bracket member 180. Movement of the piston in this cylinder to the right as seen in Figs. 8 and 10, to close the tongs is effected by the admission of pressure to the left-hand end of the cylinder through pipe 194 from the timer T, while reverse movement may be effected by exhausting this pressure and under the action of a tension spring 195 (Fig. 10), this spring extending between a stud 196 secured to the piston and a fixed anchorage on the sleeve 181.

Vertical adjustment of these tongs to compensate for variation in the heights of molds may be effected if desired by vertically adjusting the tongs 176 with respect to their holders 178, this adjustment being secured by the bolts 177.

Thus in moving a blank from station E to the blow mold at station G, it is first moved in a clockwise direction to the position L (Fig. 2), which is the second reheating position for this blank, and is in vertical alignment with the blow mold at station G. The blank is thereafter lowered to a position such that the blow mold may close about it, after which it is released by the tongs.

The blow molds

There are four blow molds shown in the accompanying drawings in stations G, H, I and K, respectively. Inasmuch as these molds are each similar to the others, only one will be described. The blow molds are formed in the usual manner in mating portions or halves as shown at 197, Figs. 1, 2, 4 and 8, these mating portions or halves being received in suitable holders 198 in the usual manner. The mold holders 198 are pivoted on a common pintle 199 which is suitably secured to the upper portion of the base 6.

Means are provided for opening and closing the blow molds at the desired times, including links 200 connecting the mold holders 198 with the outer ends of a yoke 201 which is secured to the piston rod 202 of a pneumatic cylinder 203. Pressure may be conducted from the timer T to the opposite ends of the cylinder 203 through the ports indicated diagrammatically at 204 for opening and closing the blow molds at the desired times in the manner well known in the art.

Associated with each blow mold is a bottom plate 205 which may be interchangeably mounted in a bracket 206 (Figs. 2 and 4), the bracket being in turn vertically adjustably secured to the base 6 of the machine. Thus bottom plates 205 may be interchanged when using blow molds of different sizes or types and the bottom plates may be vertically adjusted to compensate for blow molds of different heights by vertical adjustment between the bracket 206 and the base 6.

The final blow heads

Each of the final blow molds 197 is provided with a final blow head generally indicated at 207, these heads being the same for each of the molds and being shown in detail in Fig. 4 of the accompanying drawings. The heads 207 are substantially conventional in character and are arranged with a portion engaging the top of the molds 197 and mounted for floating movement with respect to the remainder of the head in a manner well known in the art. Pressure may be conducted from the timer through the pipe 208 to the head 207 for final blowing blanks in the final blow molds.

Each head 207 is mounted on the outer end of a laterally projecting arm 209 which is vertically adjustably secured to a vertical shaft 210. The shaft 210 forms the piston rod of a pneumatic cylinder 211. As shown in Fig. 1, two of the cylinders 211 are arranged in a group and are jointly secured by a common bracket 212 to the base 6 of the machine, there being two of these groups of cylinders for operating the four final blow heads.

Pressure may be conducted to the opposite ends of each of the cylinders 211 from the timer T through suitable pipes communicating with ports indicated at 213 (Fig. 4) for moving the final blow heads 207 vertically at the desired times. It is-desired further that the blow heads be moved laterally in moving them from their operative position in respect to their final blow molds to their inoperative positions, as shown in Figs. 1 and 4. For this purpose, the piston rod 210 of each cylinder is provided with a cam roller 214 on a transverse or radial axis, the cam roller cooperating with a cam slot 215 formed in an upwardly extending stationary sleeve portion 216 which may be integral or rigid with the upper head of the cylinder 211. This construction is substantially conventional and is employed in equivalent form in the "Hartford I. S. machine" above referred to. The arrangement is such that the lateral movement of the head is effected in response to the vertical movement thereof under control of the cylinder 211, and such that the initial part of the movement starting from the position of the head in cooperation with the blow mold is substantially vertical, while the subsequent movement of the head is substantially helical to the position of the head shown in the case of the head associated with the blow mold at station I in Fig. 1.

Operation of the machine

From the foregoing, the operation of the machine should be obvious, but it may be summarized as follows: Starting with the parts in substantially the position shown in Fig. 1, a charge of glass is supplied to a blank mold at station A, this charge being supplied through the funnels 80 and 83 shown in Fig. 3. At this time the neck pin 71 is elevated, the neck ring and the blank mold at station A are closed. The settle blow head 89 is then lowered to the position shown in Fig. 3 from the position shown in Fig. 1 by the admission of pressure from the timer to the upper end of cylinder 94 through the pipe 95. Settle blowing pressure may then be supplied from the timer through the pipe 99 and the settle blow head 89 to settle blow the blank in the usual manner. Subsequent to this operation, the settle head 89 is raised and moved to one side, that is, to the position shown in Fig. 1, and the neck pin 71 is lowered by the admission of pressure from the timer to the upper end of the cylinder 74 (Fig. 3). The blank mold with the settled blank therein is then moved from station A through station B to station C without further action thereon according to the disclosure of the machine in the accompanying drawings, although attention is called to the suggested alternatives hereinabove.

At the station C the counterblow baffle 100 is lowered to engage and close the upper end of the blank mold and the counterblow head 110 is raised, bringing the parts to the position shown in Fig. 3. These operations are accomplished by the admission of pressure to the upper end of cylinder 106 and to the lower end of cylinder 114 respectively as shown in Fig. 3. Counterblowing pressure may then be supplied through pipe 112 to counterblow the blank in the usual manner. After the counterblowing has been carried on for the desired time, pressure is reversed in cylinders 106 and 114 to move the counterblow baffle 100 and counterblow head 110 to their respective inoperative positions. The mold with the blank being considered therein is then moved from station C to station D by the rotating means for the blank mold carrier hereinabove described.

At station D, the blank mold is opened and simultaneously the blank mold at station A is closed both under control of cylinder 65, pressure to which is controlled by the timer T. The blank is now in readiness for its transfer, which is accomplished by swinging the neck ring holding the blank therein, as shown from station D to station E, this being accomplished by the admission of pressure to the lower end of cylinder 142, and moving the parts to the position shown in Figs. 1 and 2. The stationary tongs 165 at station E are then closed by the admission of pressure from the timer through pipe 173 to cylinder 172 (Fig. 8), so that the blank is now engaged both by the neck ring and the tongs 165. The neck ring holding the blank is then opened under the control of cylinder 157 by admitting pressure from the timer to the right hand end of this cylinder as seen in Fig. 8. The blank is now held in the tongs 165 at station E and the neck ring may then be brought back to its normal position at station E by reverse movement of the piston in cylinder 142. The blank mold may then be moved from station D to station A and closed at station A, as hereinabove described, in readiness for the receipt of the next succeeding blank in that mold, which is formed as aforesaid.

The blank at station E reheats for the desired length of time. At any time during this first reheating period, tongs 176 associated with the blow mold at station G are moved to engage beneath the tongs 165 at station E and support the blank at this station. The tongs 165 may be opened once the blank is supported in tongs 176 and at the termination of the first reheating period the blank is moved from station E to station L by movement of the tongs 176 angularly about the vertical axis of the column 14. The blank continues to reheat at station L (the second reheating station) for a desired period of time at the termination of which it is lowered into the blow mold at station G, which is open at that time to receive it, the blow head 207 being at its inoperative position during the lowering of the blank into the mold.

The blow mold at station G is then closed about the blank by the admission of fluid pressure to the left hand end, as seen in Figs. 1 and 2 of cylinder 203 associated with the blow mold at station G. The tongs 176 may then be opened to release the blank to the blow mold and moved back to receive the next succeeding blank at station E as aforesaid. The blow head 207 associated with the blow mold at station G is then moved laterally and simultaneously lowered to its operative position and final blowing pressure is supplied from the timer through the pipe 208 and the blow head 207 to final blow the article at station G. This completes the formation of a single blank.

Also, from the foregoing, the general cycle of the machine in forming a plurality of blanks should be obvious, but here again it will be summarized at this time for the purpose of clarity.

The machine as disclosed comprises four blank molds and four blow molds, there being a neck ring associated with each of the blank molds, two intermediate stationary tongs, and four secondary tongs, one of which is individual to each of the four blow molds. The arrangement is such that each blank mold always supplies blanks to a single blow mold and alternate blank molds supply blanks to the stationary tongs at stations E, the remaining blank molds supplying blanks for transfer to station F.

As a result of this manner of operation, all but one of the blank molds may be simultaneously occupied in forming blanks, the stationary tongs at stations E and F may also be in operation simultaneously, the movable tongs 176 associated with the respective blow molds may also be in operation simultaneously, and the final blow molds may also be in operation for substantially the entire time.

Under these circumstances two or three, and even four, blanks, all of which are formed from charges supplied to the same blank mold, may be simultaneously in the process of formation into completed articles. For example, one blank mold may be located at station A and a charge of glass may have been supplied thereto. The immediately preceding blank formed in the same blank mold may be supported in the stationary tongs 165 at station E. The next preceding blank formed in the same blank mold may be supported in tongs 176 at station L. The fourth or next preceding blank formed in the same blank mold may be enclosed in the blow mold at station G. This situation or one closely parallel thereto may exist as to each of the other blank molds at some time in their normal cycle of operation of the apparatus. Thus, for each of the blank molds, there will be a time in the normal cycle of the machine when two or three, and even four, charges of glass may be simultaneously in the process of formation, all of these charges having been successively supplied to the same blank mold.

All this makes for a very efficient utilization of the time of the several molds provided on the machine, as well as for the provision of a desired cycle of operation from the point of view of the glass, advantage being taken of the several tongs to sustain the blanks for the necessary or desired reheating period at some position away from either the blank molds or the blow molds.

*Conclusion*

While I have shown and described but one embodiment of my invention in detail in the foregoing description and accompanying drawings, it will be obvious that many changes in details and in construction may be made, all without departing from the spirit and scope of my invention. I do not wish to be limited, therefore, except by the scope of the appended claims, which are to be construed as broadly as the state of the prior art permits.

I claim:

1. Apparatus for forming hollow glass articles, comprising a rotatable blank mold carrier, a plurality of blank molds thereon, means for imparting unidirectional rotation to said blank mold carrier, means for successively forming charges of glass successively supplied to said blank molds into blanks therein, a plurality of stationary blow molds, means for successively transferring blanks formed in said blank molds to said blow molds, and means for simultaneously blowing a plurality of blanks to final form in said blow molds, all the aforesaid means being so constructed and arranged that each article formed thereby may be given the same treatment as to mold contact and reheat times as every other article.

2. Apparatus for forming hollow glass articles, comprising a rotatable blank mold carrier, a plurality of blank molds thereon, means for imparting unidirectional rotation to said blank mold carrier, means for successively forming charges of glass successively supplied to said blank molds into blanks therein, a plurality of stationary blow molds equal in number to the number of said blank molds, means for successively transferring blanks formed in said blank molds always to respectively associated blow molds, means for blowing blanks to final form in said blow molds, and adjustable timing means for controlling the operations of all the aforesaid means so constructed and arranged that glass articles may be formed in the several pairs of associated blank and blow molds all with the same timing of all the steps and by adjustment of the timing means, with different timing for certain at least of the forming and reheating operations usable in making differently shaped articles in different pairs or sets of molds.

3. Apparatus for forming hollow glass articles, comprising a rotatable blank mold carrier, a plurality of blank molds mounted thereon in neck-down position, means for imparting unidirectional rotation to said blank mold carrier, means for successively forming charges of glass successively supplied to said blank molds into blanks therein, a plurality of stationary blow molds arranged in neck-up positions, means for successively transferring blanks formed in said blank molds to said blow molds including means for reverting the blanks from neck-down to neck-up positions, and means for simultaneously blowing a plurality of blanks to final form in said blow molds, all the aforesaid means being so constructed and arranged that each article formed thereby may be given the same treatment as to mold contact and reheating times as every other article.

4. Apparatus for forming hollow glass articles, comprising a rotatable blank mold carrier, a plurality of blank molds thereon in neck-down position, means for forming charges of glass supplied to said blank molds into blanks therein, a plurality of stationary blow molds arranged in neck-up positions, means for transferring blanks formed in said blank molds to said blow molds including means for reverting the blanks from neck-down to neck-up positions and also including means for suspending the blanks by their neck portions for reheating for a predetermined material period of time subsequent to their reversion as aforesaid and prior to the movement of the blanks to the blow mold positions, and means for blowing blanks to final form in said blow molds.

5. Apparatus for forming hollow glass articles, comprising a rotatable blank mold carrier, a plurality of blank molds thereon in neck-down position, a neck ring cooperable with each of said blank molds respectively and mounted for inversion on and with respect to said carrier, means for forming charges of glass supplied to said blank molds and neck rings into blanks therein, a plurality of stationary blow molds arranged in neck-up positions adjacent to said blank mold carrier, means for transferring blanks formed in said blank molds to said blow molds including inverting means for said neck rings and also including means separate and distinct from said neck rings and not partaking of the rotating movements of said carrier for transferring blanks from said neck rings to said blow molds, and means for blowing blanks to final form in said blow molds.

6. Apparatus for forming hollow glass articles, comprising a rotatable blank mold carrier, a plurality of blank molds thereon in neck-down position, a neck ring cooperable with each of said blank molds respectively and mounted for inversion on and with respect to said carrier, means for forming charges of glass supplied to said blank molds and neck rings into blanks therein, a plurality of stationary blow molds arranged in neck-up positions adjacent to said blank mold carrier, means for blowing blanks to final form in said blow molds, and means for transferring blanks formed in said blank molds to said blow molds including inverting means for said neck molds, and tongs individual to said blow molds rings, for moving blanks released from said neck rings to their respectively associated blow molds.

7. Apparatus for forming hollow glass articles, comprising a rotatable blank mold carrier, a plurality of blank molds thereon in neck-down position, a neck ring cooperable with each of said blank molds respectively and mounted for inversion on and with respect to said carrier, means for forming charges of glass supplied to said blank molds and neck rings into blanks therein, a plurality of stationary blow molds arranged in neck-up positions adjacent to said blank mold carrier, means for blowing blanks to final form in said blow molds, and means for transferring blanks formed in said blank molds to said blow molds, including inverting means for said neck rings, at least one stationary tongs to which blanks are transferred by said neck rings for reheating, and other means for transferring blanks from said stationary tongs to said blow molds.

8. Apparatus for forming hollow glass articles, comprising a rotatable blank mold carrier, a plurality of blank molds thereon in neck-down position, a neck ring cooperable with each of said blank molds respectively and mounted for inversion on and with respect to said carrier, means for forming charges of glass supplied to said blank molds and neck rings into blanks therein, a plurality of stationary blow molds arranged in neck-up positions adjacent to said blank mold carrier, means for blowing blanks to final form in said blow molds, and means for transferring blanks formed in said blank molds to said blow molds, including inverting means for said neck rings, at least one stationary tongs to which blanks are transferred by said neck rings and to which the blanks are released so that they may be suspended from said stationary tongs for reheating, and other tongs individual to each of said blow molds for moving blanks from said stationary tongs to the resepctive blow molds.

9. Apparatus for forming hollow glass articles, comprising a rotatable blank mold carrier, a plurality of blank molds thereon in neck-down position, a neck ring cooperable with each of said blank molds respectively and mounted for inversion on and with respect to said carrier, means for forming charges of glass supplied to said blank molds and neck rings into blanks therein, a plurality of stationary blow molds arranged in neck-up positions adjacent to said blank mold carrier, means for blowing blanks to final form in said blow molds, and means for transferring blanks formed in said blank molds to said blow molds, including inverting means for said neck rings, tongs individual to said blow molds for moving blanks released from said neck rings to intermediate reheating positions and thereafter, by a separate movement, to the respective blow molds, and means for moving said tongs as aforesaid.

10. Apparatus for forming hollow glass articles, comprising a rotatable blank mold carrier, a plurality of blank molds thereon in neck-down position, a neck ring cooperable with each of said blank molds respectively and mounted for inversion on and with respect to said carrier, means for forming charges of glass supplied to said blank molds and neck rings into blanks therein, a plurality of stationary blow molds arranged in neck-up positions adjacent to said blank mold carrier, means for blowing blanks to final form in said blow molds, and means for transferring blanks formed in said blank molds to said blow molds, including inverting means for said neck rings, tongs individual to said blow molds for moving blanks released from said neck rings in a substantially horizontal plane to intermediate reheating positions above and in substantially vertical alignment with their respective blow molds and thereafter for lowering the blanks to position at which the respective blow molds may enclose the blanks, and means for moving said tongs as aforesaid.

11. Apparatus for forming hollow glass articles, comprising a rotatable blank mold carrier, a plurality of blank molds thereon in neck-down position, a neck ring cooperable with each of said blank molds respectively and mounted for inversion on and with respect to said carrier, means for forming charges of glass supplied to said blank molds and neck rings into blanks therein, a plurality of stationary blow molds arranged in neck-up positions adjacent to said blank mold carrier, means for blowing blanks to final form in said blow molds, and means for transferring blanks formed in said blank molds to said blow molds, including inverting means for said neck rings, at least one stationary tongs to which blanks are transferred by said neck rings for reheating, other and different tongs, individual to each of said blow molds for transferring blanks from said stationary tongs to said blow molds, means for moving the last named tongs to move the blanks laterally to second reheating positions for the blanks above and substantially vertically aligned with said blow molds, and other means for lowering the last named tongs and the blanks therein to positions at which the blanks may be enclosed by said blow molds, all the transfer means being so constructed and arranged that all blanks will be moved through paths of the same length and character and may be given the same treatment in reheating.

12. Apparatus for forming hollow glass articles, comprising an intermittently rotating blank mold carrier, four blank molds thereon in neck-down position, means for rotating said carrier to bring said molds to a charging and settling station, a counterblowing station, and a transfer station, four blow molds cooperable respectively with said blank molds and arranged in stationary neck-up positions in a straight line which is perpendicular at its mid point to a line radial of said blank mold carrier through the transfer station of the blank molds, means for forming charges of glass supplied to said blank molds into blanks therein, means for blowing blanks to final form in said blow molds, and means for transferring blanks formed in said blank molds to the respectively associated blow molds and so constructed and arranged that alternate blanks formed in said blank molds are delivered to the first and second blow molds in the line and the other alternate blanks are delivered to the third and fourth of said blow molds.

13. Apparatus for forming hollow glass articles, comprising an intermittently rotating blank mold carrier, four blank molds thereon in neck-down position, means for rotating said carrier to bring said molds to a charging and settling station, a counterblowing station, and a transfer station, four blow molds cooperable respectively with said blank molds and arranged in stationary neck-up positions in a straight line which is perpendicular at its mid point to a line radial of said blank mold carrier through the transfer station of the blank molds, means for forming charges of glass supplied to said blank molds into blanks therein, means for blowing blanks to final form in said blow molds, and means for transferring blanks formed in said blank molds to the respectively associated blow molds including two tongs, one for the first and second of said blow molds in line and the other for the third and fourth of said blow molds, the transferring means being so constructed, arranged and timed that alternately completed blanks are supported by each of said tongs for reheating intermediate the blank and blow molds and are thereafter transferred to the blow molds which are respectively associated with the blank molds in which such blanks were formed.

14. Apparatus for forming hollow glass articles, comprising an intermittently rotating blank mold carrier, four blank molds thereon in neck-down position, means for rotating said carrier to bring said molds to a charging and settling station, a counterblowing station, and a transfer station, four blow molds cooperable respectively with said blank molds and arranged in stationary neck-up positions in a straight line which is perpendicular at its mid point to a line radial of said blank mold carrier through the transfer station of the blank molds, means for forming charges of glass supplied to said blank molds into blanks therein, means for blowing blanks to final form in said blow molds, and means for transferring blanks formed in said blank molds to the respectively associated blow molds including two stationary tongs, one for the first and second of said blow molds in line and the other for the third and fourth of said blow molds, means for transferring alternately completed blanks from said blank molds to said stationary tongs respectively, and other tongs individual to each of said blow molds for transferring blanks from their reheating positions in said stationary tongs to the respective blow molds.

15. Apparatus for forming hollow glass articles, comprising an intermittently rotating blank mold carrier, four blank molds thereon in neck-down position, means for rotating said carrier to bring said molds to a charging and settling station, a counterblowing station and a transfer station, an invertible neck ring on said carrier cooperable with each of said blank molds, means for forming charges of glass supplied to said blank molds and neck rings into blanks therein, four blow molds cooperating respectively with said blank molds and arranged in stationary neck-up positions in a straight line adjacent to said blank mold carrier, means for blowing blanks to final form in said blow molds, and means for transferring blanks formed in said blank molds to said blow molds including two separate and distinct means not partaking of the rotary movements of said carrier for inverting neck rings, each cooperable with alternate neck rings for transferring blanks to two adjacent blow molds, said transferring means as a whole being so constructed, arranged and timed that successively completed blanks are transferred to and received by said blow molds in the following order: the first to one of the blow molds of the first group including the first and second blow molds, the second to one of the blow molds of the second group including the third and fourth blow molds, the third to the other blow mold of the first group, and the fourth to the other blow mold of the second group.

16. Apparatus for forming hollow glass articles, comprising a rotatable blank mold carrier, a plurality of blank molds thereon in neck-down position, a partible neck ring cooperable with each of said blank molds respectively and mounted for inversion on and with respect to said carrier on a substantially horizontal axis outside the path of movement of said blank molds and vertically intermediate the upper and lower ends thereof, means including a linkage moving with each of said neck rings respectively for resiliently holding the neck rings in their closed positions, means for forming charges of glass supplied to said blank molds and neck rings into blanks therein, a plurality of stationary blow molds arranged in neck-up positions adjacent to said carrier, means for blowing blanks to final form in said blow molds, and means for transferring blanks from said blank molds to said blow molds including inverting means for said neck rings, and also including means outside said carrier and not partaking of the rotation thereof for cooperating successively with all of said neck rings subsequent to the inversion thereof to suspend therefrom the blanks which are gripped thereby for engaging said linkages to open said neck rings for the release of blanks therefrom.

17. Apparatus for forming hollow glass articles, comprising an intermittently rotating blank mold carrier, four blank molds thereon in neck-down position, a partible neck ring associated with each of said blank molds and mounted on said carrier for inversion with respect thereto about a horizontal axis laterally outside the path of the blank molds and vertically intermediate the top and bottom of such molds, means including a mechanical linkage associated with each neck ring for resiliently holding it in closed position, means for rotating said carrier intermittently to bring the blank molds and associated neck rings to a charging and settling station, a counterblowing station and a transfer station, means for forming charges of glass supplied to said blank molds and neck rings into blanks therein, four stationary blow molds arranged in neck-up positions in a straight line which is perpendicular at its mid point to a line radial of said blank mold carrier through the transfer station of the blank molds, two stationary tongs arranged to receive blanks alternately from said neck rings and positioned respectively intermediate the first and second blow molds and intermediate the third and fourth blow molds and both said tongs being materially above the vertical level of said blow molds, two inverting means cooperating alternately with succeeding neck rings to move blanks held therein to positions at which they may be grasped by said stationary tongs respectively, a common means including a stationary fluid pressure cylinder for engaging the mechanical linkages of all said neck rings for releasing blanks therefrom to said tongs, four other and distinct movable tongs associated respectively with said blow molds for moving blanks from said two stationary tongs to said blow molds, means for moving each of the last named tongs laterally to move blanks to positions above and in vertical alignment with their respective blow molds, means for separately moving the last named tongs vertically for moving blanks downwardly to positions at which they may be enclosed by the respective blow molds, and means for blowing blanks to final form in said blow molds.

18. Apparatus for forming hollow glass articles, comprising a rotatable blank mold carrier, a plurality of blank molds thereon, means for imparting unidirectional rotation to said blank mold carrier, a plurality of stationary blow molds equal in number to the number of said blank molds and arranged respectively to receive blanks therefrom, means for successively forming charges of glass successively supplied to said blank molds into blanks therein, means for successively transferring blanks formed in said blank molds to their respectively associated blow molds, means for simultaneously blowing a plurality of blanks to final form in said blow molds, and means for timing the operations of all the aforesaid means to the end that during the normal continuous operation of the entire apparatus, a second charge will have been supplied to and will be enclosed by each of said blank molds prior to the completion of the final blowing operation in the respectively associated final blow mold on the immediately preceding charge of glass which was supplied to that same blank mold.

19. Apparatus for forming hollow glass articles, comprising a rotatable blank mold carrier, a plurality of blank molds thereon, a plurality of stationary blow molds equal in number to the number of said blank molds and arranged respectively to receive blanks therefrom, means for forming charges of glass supplied to said blank molds into blanks therein, means for transferring blanks formed in said blank molds to their respectively associated blow molds, means for blowing blanks to final form in said blow molds, and means for timing the operations of all the aforesaid means to the end that during the normal continuous operation of the entire apparatus at least three charges of glass, all of which were supplied to the same blank mold, will be simultaneously in the process of formation as follows: one having been supplied to one of said blank molds and being enclosed thereby, a second reheating while being supported in said transferring means intermediate the blank mold in which it was formed into a blank and the associated blow mold, and the third being enclosed in the blow mold associated with the blank mold in which it was formed.

20. Apparatus for forming hollow glass articles, comprising a rotatable blank mold carrier, a plurality of blank molds thereon, a plurality of stationary blow molds equal in number to the number of said blank molds and arranged respectively to receive blanks therefrom, means for forming charges of glass supplied to said blank molds into blanks therein, means for transferring blanks formed in said blank molds to their respectively associated blow molds, means for blowing blanks to final form in said blow molds, and means for timing the operation of all the aforesaid means to the end that during the normal continuous operation of the entire apparatus at least four charges of glass, all of which were supplied successively to the same blank mold, will be simultaneously in the process of formation as follows: one having been supplied to said blank mold and being enclosed thereby, the second and third reheating while being supported in separate elements of said transferring means at spaced positions intermediate the blank mold in which they were successively formed into blanks and the associated blow mold, and the fourth being enclosed in said associated blow mold.

21. Apparatus for forming hollow glass articles, comprising a plurality of movable blank molds, means for moving said blank molds successively to a single point for receiving thereat charges of glass, means for forming charges of glass supplied to said blank molds into blanks therein, a corresponding number of stationary blow molds arranged respectively to receive blanks from said blank molds, means for transferring blanks from said blank molds to said blow molds, and means for blowing blanks to final form in said blow molds.

22. Apparatus for forming hollow glass articles, comprising a rotary carrier, a plurality of blank molds thereon in neck-down position, means for rotating said carrier to bring said blank molds successively to a single predetermined position at which charges of glass are successively supplied thereto from above through their open bottom ends, a neck ring associated with the lower end of each of said blank molds during the charging thereof, means for forming charges of glass supplied to said blank molds and neck rings into blanks therein, a plurality of stationary blow molds corresponding in number to the number of said blank molds and arranged for receiving blanks from said blank molds respectively, means for transferring blanks from said blank molds to the respectively associated blow molds including said neck rings, and means for blowing blanks to final form in said blow molds.

23. Apparatus for forming hollow glass articles, comprising a plurality of blank molds, means for forming charges of glass supplied to said blank molds into blanks therein, a plurality of stationary blow molds, means for blowing blanks to final form in said blow molds, and means for transferring blanks from a plurality of said blank molds to a single intermediate reheating station and therefrom to a plurality of said blow molds.

24. Apparatus for forming hollow glass articles, comprising a plurality of blank molds, means for forming charges of glass supplied to said blank molds into blanks therein, a plurality of blow molds, means for blowing blanks to final form in said blow molds, and transferring means for transferring blanks from a plurality of said blank molds to a single first reheating station, from said first reheating station to second reheating stations individual to each of a plurality of said blow molds, and from said second reheating stations to the respectively associated blow molds.

HAROLD A. WADMAN.